United States Patent
Skopic (10) Patent No.: US 7,950,720 B2
(45) Date of Patent: *May 31, 2011

(54) APPARATUS FOR REDUCING DRAG ON VEHICLES WITH PLANAR REAR SURFACES

(76) Inventor: Joseph Skopic, Bloomsberg, PA (US)

( * ) Notice: Subject to any disclaimer, the term of this patent is extended or adjusted under 35 U.S.C. 154(b) by 70 days.

This patent is subject to a terminal disclaimer.

(21) Appl. No.: 12/398,643

(22) Filed: Mar. 5, 2009

(65) Prior Publication Data
US 2010/0225143 A1 Sep. 9, 2010

(51) Int. Cl.
*B62D 35/00* (2006.01)
*B61D 17/00* (2006.01)

(52) U.S. Cl. .... 296/180.1; 105/1.3; 180/903; 296/180.4

(58) Field of Classification Search .... 296/180.1–180.5; 180/903; 105/1.3
See application file for complete search history.

(56) References Cited

U.S. PATENT DOCUMENTS

| | | | |
|---|---|---|---|
| 1,871,396 A | 6/1932 | Stalker | |
| 2,101,793 A * | 12/1937 | Field, Jr. | 280/423.1 |
| 2,243,906 A | 4/1938 | Andre | |
| 3,000,663 A | 6/1959 | Lucchesi | |
| 3,960,402 A * | 6/1976 | Keck | 296/180.4 |
| 3,999,797 A | 12/1976 | Kirsch et al. | |
| 4,103,957 A | 8/1978 | Landry et al. | |
| 4,214,787 A * | 7/1980 | Chain | 296/180.4 |
| 4,257,640 A | 3/1981 | Wiley | |
| 4,290,639 A * | 9/1981 | Herpel | 296/180.3 |
| 4,309,053 A | 1/1982 | Lett | |
| 4,316,630 A | 2/1982 | Evans | |
| 4,320,920 A | 3/1982 | Goudey | |
| 4,421,354 A | 12/1983 | Lemaster | |
| 4,433,865 A | 2/1984 | Crompton, Jr. | |
| 4,451,074 A | 5/1984 | Scanlon | |
| 4,458,936 A | 7/1984 | Mulholland | |
| 4,508,380 A | 4/1985 | Sankrithi | |

(Continued)

FOREIGN PATENT DOCUMENTS

CA 2593529 6/2006
(Continued)

OTHER PUBLICATIONS

McCallen, R. et al. "Progress in Reducing Aerodynamic Drag for Higher Efficiency of Heavy Duty Trucks (Class 7-8)" US Dept. of Enegy by Lawrence Livermore National Laboratory, Oct. 18, 2000.

(Continued)

*Primary Examiner* — Glenn Dayoan
*Assistant Examiner* — Paul A Chenevert
(74) *Attorney, Agent, or Firm* — Kramer & Amado P.C.

(57) ABSTRACT

Vanes are used for reducing drag on a moving vehicle having a substantially planar rear surface. The vanes are mounted to the vehicle using pliant material which creates no work for the driver of the vehicle during loading or unloading activities. The apparatus is extremely light weight, and includes a rigid vane of length L having a leading edge, a trailing edge, and an aerodynamic center positioned at a distance of between 0.15 L and 0.5 L from the leading edge. The vane has an inner surface facing the vehicle and an outer surface. Multiple pliant attachment devices connect the vane to the vehicle. The vane helps prevent or reduce formation of a zone of turbulent air behind the vehicle. The apparatus allows substantial reductions in fuel consumption and truck $CO_2$ emissions during use.

27 Claims, 7 Drawing Sheets

U.S. PATENT DOCUMENTS

| | | | | |
|---|---|---|---|---|
| 4,509,786 A | * | 4/1985 | Gregg | 296/180.3 |
| 4,553,781 A | * | 11/1985 | Johnson | 254/327 |
| 4,674,788 A | | 6/1987 | Ohmura et al. | |
| 4,688,841 A | | 8/1987 | Moore | |
| 4,818,015 A | | 4/1989 | Scanlon | |
| 4,878,707 A | | 11/1989 | Meyers | |
| 5,146,203 A | * | 9/1992 | Simuni | 340/443 |
| 5,199,762 A | * | 4/1993 | Scheele et al. | 296/180.1 |
| 5,280,990 A | | 1/1994 | Rinard | |
| 5,348,366 A | | 9/1994 | Baker | |
| 5,375,903 A | | 12/1994 | Lechner | |
| 5,498,059 A | | 3/1996 | Switlik | |
| 5,658,038 A | | 8/1997 | Griffin | |
| 5,823,610 A | | 10/1998 | Ryan | |
| 5,842,734 A | | 12/1998 | Lechner | |
| 6,257,654 B1 | | 7/2001 | Boivin | |
| 6,309,010 B1 | | 10/2001 | Whitten | |
| 6,485,087 B1 | | 11/2002 | Roberge | |
| 6,595,578 B1 | | 7/2003 | Calsoyds | |
| 6,666,498 B1 | | 12/2003 | Whitten | |
| 6,799,791 B2 | | 10/2004 | Reiman | |
| 6,854,788 B1 | * | 2/2005 | Graham | 296/180.4 |
| 7,240,958 B2 | * | 7/2007 | Skopic | 296/180.1 |
| 7,641,262 B2 | * | 1/2010 | Nusbaum | 296/180.5 |
| 2002/0021023 A1 | | 2/2002 | Leban | |
| 2002/0030384 A1 | | 3/2002 | Basford | |
| 2003/0011210 A1 | | 1/2003 | Cory | |
| 2003/0038508 A1 | | 2/2003 | Fairburn | |
| 2003/0205913 A1 | | 11/2003 | Leonard | |
| 2004/0119319 A1 | | 6/2004 | Reiman | |
| 2008/0093886 A1 | * | 4/2008 | Nusbaum | 296/180.1 |

FOREIGN PATENT DOCUMENTS

| | | | |
|---|---|---|---|
| DE | 4014577 C1 | | 10/1991 |
| DE | 4237458 A1 | | 5/1994 |
| JP | 60146747 A | | 8/1985 |
| JP | 63180575 A | * | 7/1988 |
| JP | 02-290788 | | 11/1990 |
| JP | 06-016157 | | 1/1994 |

OTHER PUBLICATIONS

Walter, K. "'Research Highlights' Reducing Aerodynamic Drag", Truck Aerodynamics, Lawrence Livermore National Laboratory, S&TR , May 2003.

* cited by examiner

APPARATUS FOR REDUCING DRAG ON VEHICLES WITH PLANAR REAR SURFACES

BACKGROUND OF THE INVENTION

1. Field of the Invention

The invention relates generally to devices for reducing air flow resistance and drag on trucks, semitrailers, railway cars, and other vehicles. More particularly, the invention relates to devices for redirecting air from airstreams passing around a vehicle into zones of turbulent air at the rear of the vehicle.

2. Description of the Prior Art

The profitability of long-distance highway cargo transport depends heavily on the cost of fuel, and on the efficiency with which the fuel is utilized. The cost of fuel is largely outside the control of the cargo transporter; however, the efficiency of fuel utilization may be increased. One method involves reducing resistance to forward motion of a vehicle through the air. Resistance to vehicular motion takes two major forms. First, the volume of air immediately in front of the vehicle acts as a barrier. A vehicle is then required to expend energy to push this volume of air aside, thereby reducing fuel economy. Significant advances have been made in aerodynamic design of semitrailer tractors and trailers, including the incorporation of deflectors to redirect air around substantially vertical planar surfaces of vehicles. A commonly used deflector takes the form of a dome-shaped device mounted on the top of a semitrailer tractor cab; the dome deflects air upward toward the top of the trailer, rather than allowing the air to flow directly against the vertical front of the trailer. Resistance to forward motion of the vehicle from the body of air in front of the vehicle is reduced. A measurable increase in the efficiency of fuel utilization, and a concomitant increase in mileage traveled per gallon of fuel used (fuel mileage), is obtained.

A second, and at least equally pernicious, form of resistance to a vehicle in motion lies in the drag on the vehicle caused by the formation of reduced-pressure zones at the rear of the vehicle, or in between units of a combination vehicle, such as a string of multiple trailers. The airstreams passing over the top and along the sides of the vehicle recombine behind the vehicle. However, due to turbulence caused by the passage of the vehicle, a space filled with low pressure air forms between the rear of the vehicle and the point at which these airstreams fully recombine. This zone of turbulent low-pressure air acts as a partial vacuum, and induces drag on the vehicle in a backward direction. The work that must be preformed by the engine to pull the vehicle forward is then increased, thereby decreasing fuel mileage.

Aerodynamic drag on vehicles has long been recognized in the art. It has been determined that, for a tractor-trailer weighing 80,000 pounds travelling at 70 miles per hour, 65% of the energy expended by the vehicle is used to overcome aerodynamic drag. Of this 65% of the energy expended by the vehicle, 80% is expended to overcome drag forces at the rear of the vehicle. A number of solutions to this problem have been proposed. One common solution lies in streamlining the rear of a trailer. Airstreams passing along the trailer flow together more smoothly, with reduced turbulence. A smaller low-pressure zone is produced at the rear of the vehicle, with a marked reduction in drag. However, a number of legacy trailers exist, which would require a sizable expense to replace. Accordingly, methods of reducing drag which may be easily and inexpensively retrofitted onto existing trailers would be attractive to trucking companies.

One method of retrofitting existing trailers with streamlined drag-reduction devices lies in the use of conical or pyramidal devices on the rear of a trailer. Such vanes act in the same manner as the streamlined rear of a trailer as described above, in that the conical or pyramidal devices allow airstreams to flow together more smoothly. An advantage over the above streamlined trailers is that conical or pyramidal devices may be readily retrofitted onto an existing, non-streamlined, trailer. However, these devices do have certain drawbacks. When used with trailer trucks, these devices normally fit over the doors at the rear of the trailer. Thus, these devices may not be simply mounted on a trailer and left in place. Instead, these devices must be assembled and mounted on the rear of the trailer after completion of the loading process. Similarly, such devices must be disassembled and removed from the trailer before unloading can begin, causing inconvenient delays in the unloading and loading processes. More importantly, at least some of the savings from increases in fuel mileage or fuel economy may be offset by increased hourly costs for labor. Another drawback of using rear-mounted devices on trailers is that the devices add significantly to the length of a trailer, making it difficult to use these conical or pyramidal devices to reduce drag in between a pair of trailers mounted in series.

Some designs allow the vanes to slide into or out of tracks mounted on the side of the vehicle; while the use of such tracks accelerates the process of positioning vanes after loading and unloading the trailer, the cost and complexity of retrofitting an existing trailer with a streamlined vane is significantly increased.

A second method of retrofitting trailers with a drag-reducing device lies in fitting vanes to the rear corners of the trailers. Corner vanes redirect airstreams passing along the sides of the vehicle to induce flow into a low-pressure zone behind the trailer, thereby reducing the magnitude of the partial vacuum behind the trailer, and hence reducing the drag on the vehicle. If two trailers are connected in series, formation of a low pressure zone between the trailers may be prevented by mounting vanes to the rear of the front trailer, such that air flowing along a front trailer is redirected into the space between the front trailer and rear trailer.

Use of planar boattail plates rigidly mounted to the rear surface of the vehicle has been shown to produce a 20% reduction in drag forces with a significant increase in fuel savings. These plates extend outwardly from the rear surface of the vehicle. They help to prevent air travelling along the side of the vehicle from entering a region of low pressure air immediately behind the rear surface of the vehicle. However, in the case of a vehicle having hinged doors, these boattail plates impede the doors from swinging open. Accordingly, the plates must be manually removed or adjusted by the driver to allow the door to swing fully open. In the case of a vehicle having a roll-up door, these boattail plates impede the vehicle from backing up to a loading dock. Thus, the plates must be again be manually removed or adjusted by the driver to during loading or unloading operations. As a result, boattail plates have not achieved wide acceptance.

Many vanes of the prior art are rigidly mounted to the rear corners of a trailer. While these do an effective job of preventing drag, they do impede opening the doors on the rear of the trailer. Many trailers are designed with doors that open so as to lie flat against the side of the trailer, so as to allow the trailer to be loaded or unloaded in a small or enclosed space. However, the vanes, when rigidly mounted to the trailer, prevent the doors from opening completely. The inability to fully open the vehicle doors is an inconvenience during the loading/unloading process.

It is a feature of this invention to provide vanes for attachment to vehicles which will reduce drag on the vehicles.

It is a further feature of this invention to provide vanes for attachment to vehicles which do not impede opening of vehicle doors or block vehicles from backing up to loading docks, without requiring removal or adjustment of the vanes by the driver.

The foregoing features and advantages of the invention are illustrative of those that can be achieved by the various exemplary embodiments and are not intended to be exhaustive or limiting of the possible advantages that can be realized. Thus, these and other features and advantages of the various exemplary embodiments will be apparent from the description herein or can be learned from practicing the various exemplary embodiments, both as embodied herein or as modified in view of any variation that may be apparent to those skilled in the alt. Accordingly, the present invention resides in the novel methods, arrangements, combinations, and improvements herein shown and described in various exemplary embodiments.

SUMMARY OF THE INVENTION

In light of the present need for an improved drag reduction apparatus for a vehicle, a brief summary of the present invention is presented. Some simplifications and omission may be made in the following summary, which is intended to highlight and introduce some aspects of the present invention, but not to limit its scope. Detailed descriptions of a preferred exemplary embodiment further enabling those of ordinary skill in the art to make and use the invention concepts is presented in later sections.

According to the present disclosure, reduction of drag arising from creation of a low pressure volume of turbulent air behind a generally planar rear surface of a vehicle is provided by attaching a pair of vanes to the right and left corner edges of the rear surface of the vehicle. More particularly, the invention is directed to an apparatus for reducing drag on a moving vehicle having a substantially planar rear surface, comprising a rigid vane of length L having a leading edge, a trailing edge, and a longitudinal aerodynamic center therebetween, positioned at a distance of, for example, between 0.15 L and 0.5 L from said leading edge, preferably 0.26 L from the leading edge. The vane has an inner surface facing said vehicle and an outer surface; at least one first pliant attachment means connecting the leading edge of the vane to a side surface of said vehicle; at least one second pliant attachment means connecting the trailing edge of the vane to a rear surface of said vehicle; and at least one third pliant attachment means connecting the inner surface of the vane to the vehicle. The inner surface may be connected to the side of the vehicle or to the rear of the vehicle. The third pliant attachment means is connected to the inner surface of the vane. Preferably, the third pliant attachment means is connected to the inner surface of the vane at a distance of, for example, between 0.15 L and 0.5 L from the leading edge of the vane. More preferably, the third pliant attachment means is connected to the inner surface of the vane at the aerodynamic center of the vane. As will be understood by a person of ordinary skill in the art, based on this description, the vane helps reduce or prevent formation of a zone of turbulent air behind the rear surface of the vehicle. The outer surface of the vane is preferably curved.

The at least one first pliant or flexible attachment means connects at least an upper end of the leading edge of the vane and a lower end of the leading edge of the vane to the side surface of the vehicle. In one embodiment, the at least one first pliant attachment means connects an upper end of the leading edge of the vane to the side surface of the vehicle and a second pliant attachment means connects a lower end of the leading edge of the vane to the side surface of the vehicle. The at least one first pliant attachment means may additionally comprise at least one third pliant attachment means connecting a central portion of the leading edge of the vane to the side surface of the vehicle. In various exemplary embodiments, the first, second, and third pliant attachment means may each comprise at least one cable, rope, or nylon strap, without being limited thereto.

In one embodiment, the third pliant attachment means is connected to the inner surface of the vane at the aerodynamic center of the vane. In a further embodiment, the distance between the leading edge of the vane and the aerodynamic center of the vane is 0.26 L, where L is the distance between the leading edge and the trailing edge of the vane. A door may be present in the rear surface of the vehicle, and the at least one third pliant attachment means may connect the trailing edge of the vane to the door.

In another embodiment, the distance between the leading edge of the vane and the longitudinal aerodynamic center of the vane is between 0.15 L and 0.5 L; and the third pliant attachment means is connected to the inner surface of the vane at a distance of between 0.15 L and 0.5 L from the leading edge of the vane at a point which may or may not coincide with the aerodynamic center of the vane.

In a further embodiment, the inner surface of said vane has a leading portion and a trailing portion. The leading portion of the inner surface of said vane and the trailing portion of the inner surface of said vane meet at an angle. Preferably, the trailing portion of the inner surface of said vane meets the leading portion of the inner surface of the vane with a defined angle of deflection α, said defined angle of deflection a being, for example, between 0° and 10°. More preferably, the trailing portion of the inner surface of said vane meets the leading portion of the inner surface of the vane with a defined angle of deflection α, where the defined angle of deflection α is, for example, between 0° and 7°.

Various exemplary embodiments of the apparatus may be used with a wide variety of vehicles having generally planar rear surfaces. The vehicle may, for example, have an enclosed box-like structure for carrying cargo or passengers, having a defined height. The vanes of the apparatus are attached to the side of the box-like structure, and extend for the full height of the box-like structure. The vehicle may be unpowered, such as a trailer, adapted to be towed by a second powered vehicle. The vehicle may also be a powered vehicle, such as a bus, panel truck, or delivery van. The use of pliant attachment means to connect the vane to the vehicle allows vehicle doors to be conveniently opened without manual removal or adjustment by the driver during loading or unloading operations. When the vehicle is at rest, each vane tends to hang down against a side surface of the vehicle. When the vehicle is in motion, the vanes will deploy to an operational position.

BRIEF DESCRIPTION OF THE DRAWINGS

In order to better understand the present invention, reference is made to the accompanying drawings, wherein.

DETAILED DESCRIPTION OF THE INVENTION

The term "aerodynamic center," as used in this disclosure, may be defined as, but is not limited to, the point at which the pitching moment coefficient for the vane does not vary with lift coefficient. For symmetric vanes moving through an airflow, the aerodynamic center of the vane is located approximately 25% of the length of the chordline of the vane from the leading edge of the vane (the quarter-chord point). The chordline extends from the leading edge of the airfoil to the trailing edge of the vane. For non-symmetric (cambered) vanes, the quarter-chord is only an approximation for the aerodynamic center.

Figure 1:
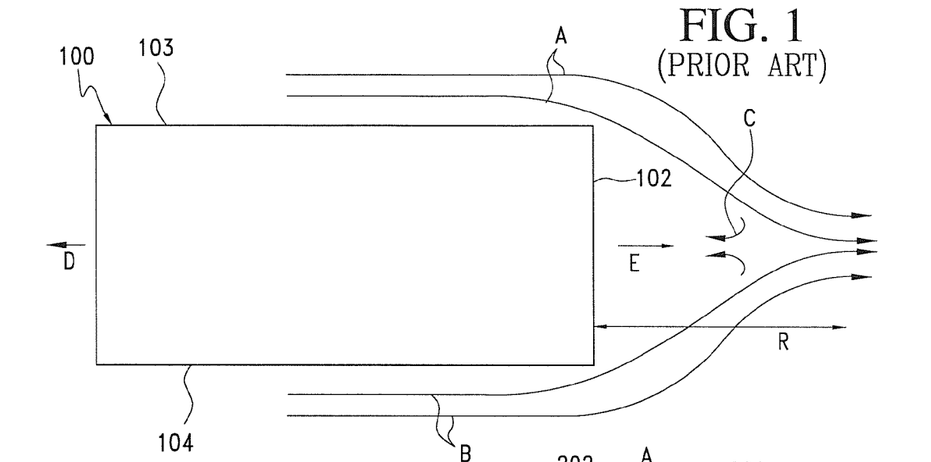
FIG. 1 shows the pattern of air flow around a prior art vehicle having a generally planar rear surface, and illustrates how drag forces arise.

FIG. 1 shows a prior art airflow around a vehicle 100, such as a trailer, having a generally planar rear surface 102, a right side 103, and a left side 104, when vehicle 100 moves in a forward direction D at a desired speed. Under these conditions, air moves, relative to vehicle 100, along the sides 103 and 104 in the direction of arrows A and B, respectively. The flow of air in the direction A and the flow of air in the direction B do not reunite immediately behind rear surface 102; rather, airflows A and B reunite at a point at a certain distance R behind surface 102. A zone of low pressure air is thereby created behind rear surface 102, between the flow of air in the direction A and the flow of air in the direction B. This low pressure zone acts as a partial vacuum, and sucks air from air flows A and B in the direction of arrows C, into the zone of low pressure air. Airflow in the direction of arrows C somewhat increases the air pressure behind surface 102, but also increases the turbulence in this volume of air. As a result, as the vehicle moves forward in the direction of arrow D, a partial vacuum containing a volume of turbulent low pressure air is carried behind vehicle 100. This volume of turbulent air creates drag on the vehicle by sucking in the direction of arrow E on surface 102. The engine causing the vehicle to move forward must work harder to cause the vehicle to move at the desired speed in direction D while simultaneously overcoming the retarding force of drag in the direction of arrow E.

Figure 2:
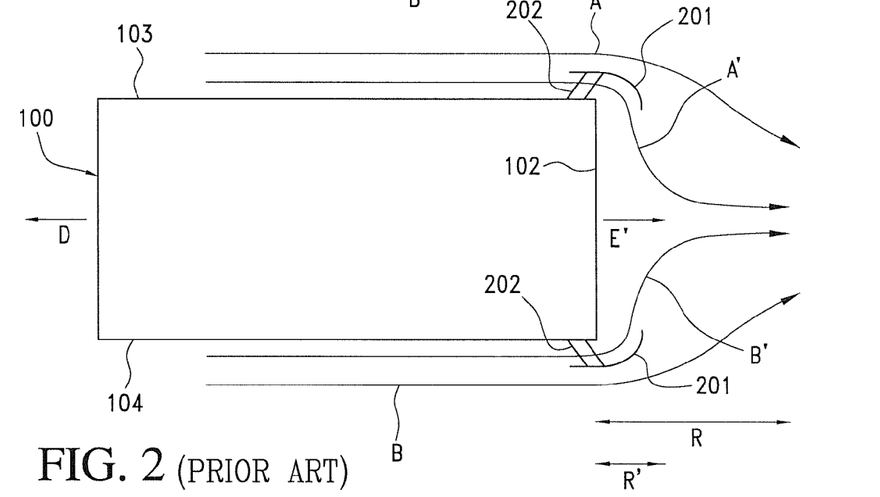
FIG. 2 shows the prior art use of vanes to modify the pattern of air flow around a vehicle having a generally planar rear surface so as to reduce the magnitude of drag forces.

FIG. 2 shows a prior art method of reducing drag on a vehicle by connecting vanes 201 to the rear of the vehicle using brackets 202. When vehicle 100 moves in a forward direction D, a leading edge of a first vane 201 captures a portion of the airflow in direction A along right side 103, and the trailing edge of the first vane redirects the captured airflow in a new direction A'. The other vane 201 redirects a portion of the airflow in direction B along left side 104 in a new direction B' in a similar fashion. The remainder of the airflows in directions A and B proceed as described above, reuniting at distance R behind surface 102 and forming a low pressure zone of air. The airflows in direction A' and direction B', after leaving vanes 201, flow directly into this zone of turbulent low pressure air behind surface 102, and reunite at a distance R' behind surface 102, where distance R' is less than distance R. This increases the air pressure and reduces turbulence behind surface 102, and reduces the extent of the drag exerted on the vehicle in the direction of arrow E' by the volume of turbulent air.

Figure 3:
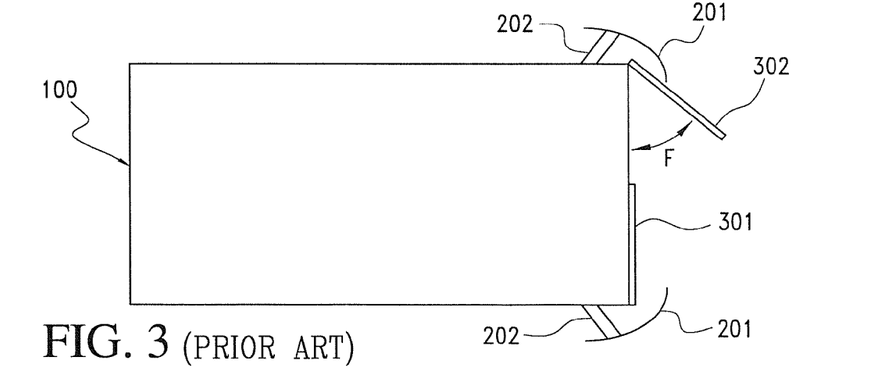
FIG. 3 shows how prior art vanes interact with a set of doors on the rear surface of a vehicle.

FIG. 3 shows prior art vanes 201 attached to the rear edges of vehicle 100, where vehicle 100 has doors 301 and 302 in its rear surface. The vanes are attached using rigid brackets 202 to hold the vanes in position. Vanes which have been rigidly attached in this fashion can cause problems when the vehicle doors are opened. These doors typically swing open or closed in the direction of arrow F to facilitate loading and unloading of the vehicle. When vanes 201 are rigidly held in position by brackets 202, the vanes prevent the door from fully opening in the direction of arrow F, complicating the loading/unloading process.

The present invention overcomes this difficulty by attaching vanes to a truck using novel pliant or flexible attachment means, where the terms "pliant" and "flexible" are used in this disclosure as synonyms. In one embodiment of the invention, shown in FIG. 4, the invention includes a cambered vane of length L, where the vane is attached to the vehicle by pliant attachment means described in greater detail below. The cambered vane is referred to by the reference number 401, with each individual part of the vane being given a separate reference number. Vane 401 has a leading edge 402 and a trailing edge 403, a curved upper surface 406, and an inner surface 405. Length L is between 3 and 10 inches, preferably between 4 and 6 inches. Vane 401 has an aerodynamic center CG, where CG is positioned a defined distance Z behind leading edge 402, where Z is greater than 0.15 L and less than 0.5 L, preferably between 0.2 L and 0.35 L, more preferably between 0.23 L and 0.3 L, most preferably about 0.26 L. Inner surface 405 also includes a leading portion 408 and a trailing portion 404. Leading portion 408 and trailing portion 404 intersect with a defined angle of deflection α. Angle α is between 0° and 10°, preferably between 0° and 7°. Chordline H is defined by a line between the leading edge 402 of vane 401 and the trailing edge 403 of vane 401. When the vane is directed into an airflow in direction G, the angle between the chordline H and airflow G is defined by angle β. The vane 401 is preferably positioned so that the angle β ranges from a minimum of 0° (i.e., chordline H is parallel to airflow G) up to about 10°. Preferably, the angle β ranges from 0° up to about 5°. More preferably, the angle β ranges from 0° up to about 4°.

Figure 4:
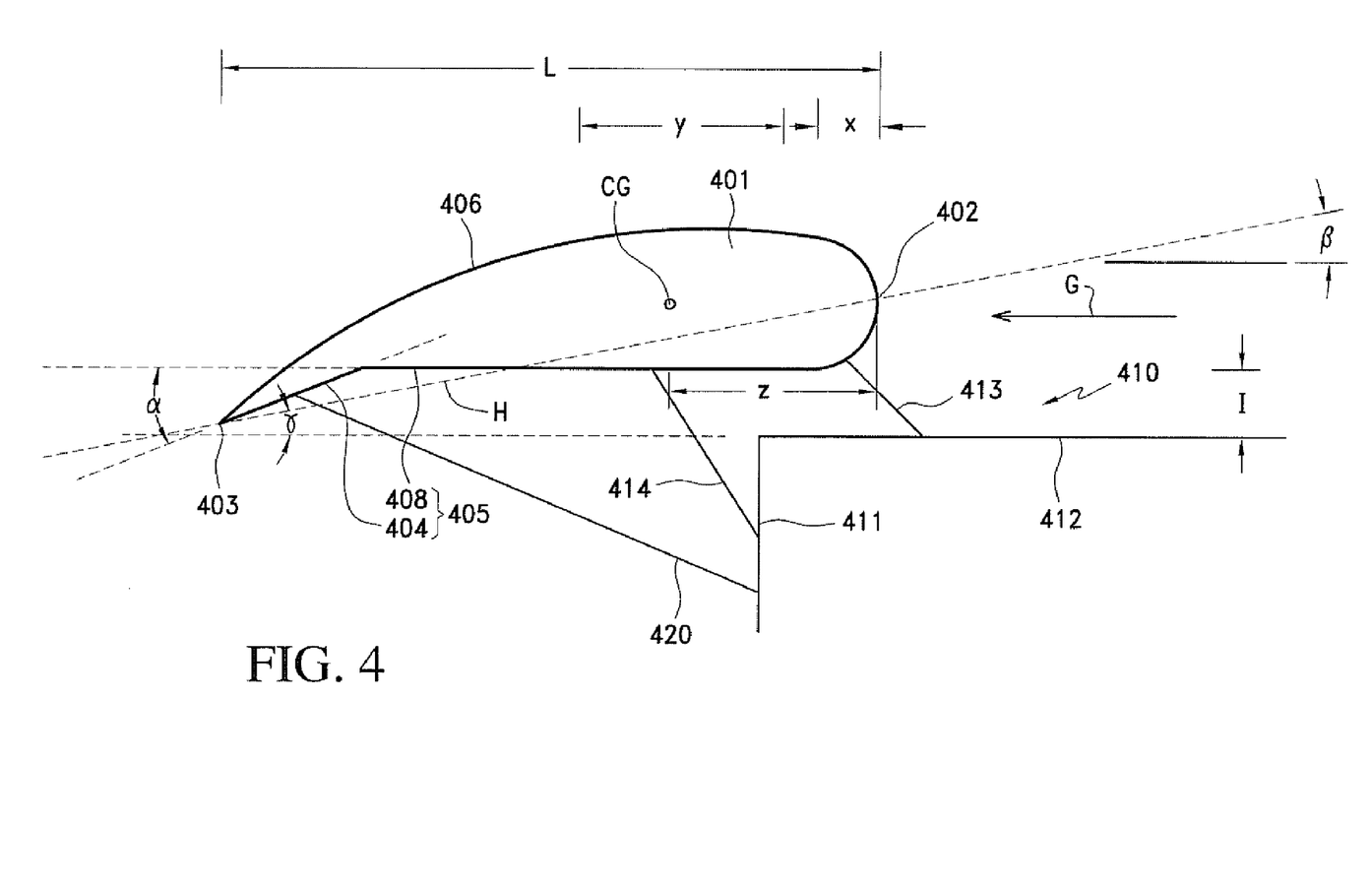
FIG. 4 shows a vane for reduction of drag, as described in the present disclosure (Please note that the vane and the truck are not necessarily drawn to scale in these figures).

Again as shown in FIG. 4, the vane 401 is positioned on a vehicle 410 having a generally planar rear surface 411 and a side surface 412. The vane 401 is positioned so that vane 401 extends behind the rear vehicle surface 411, with the forward edge of planar inner surface 405 of vane 401 being adjacent to side vehicle surface 412, with a defined distance I separating surfaces 405 and 412. In one embodiment, the vane 401 is oriented so that chordline H makes an angle γ with the vehicle ranging from a minimum of 0° (i.e., chordline H is parallel to airflow G) up to about 10°. Preferably, the angle γ ranges from 2° up to about 8°. More preferably, the angle γ ranges from 3° up to about 7°. In a second embodiment, the vane 401 is oriented so that surface 405 is parallel to side vehicle surface 412. The inner surface 405 of vane 401 is preferably about 0.25 to 2.0 inches from the surface 412 of the vehicle, more preferably from 0.3 to 1.0 inch (identified as distance I).

Again as shown in FIG. 4, the vane 401 is connected to vehicle 410 by at least one first pliant attachment means 413 connecting the leading edge 402 of the vane 401 to the side surface 412 of the vehicle. First pliant attachment means 413 is connected at one end to side surface 412, and at the other end to the leading edge 402 of the vane 401. Specifically, for the purposes of this application, connection to the leading edge 402 of the vane 401 means connection to the inner surface of the vane at a distance of less than or equal to X from the forwardmost point of the leading edge 402 of the vane 401, where X is 0.1 L. Vane 401 is also connected to vehicle 410 by at least one second pliant attachment means 420 connecting the trailing edge 403 of the vane 401 to the rear surface 411 of the vehicle. Second pliant attachment means 420 is connected at one end to rear surface 411, and at the other end to the trailing edge 403 of the vane 401. The pliant attachment means may be ropes, cables, or nylon straps.

Again as shown in FIG. 4, the vane 401 is also connected to vehicle 410 by at least one third pliant attachment means 414 connecting the vane 401 to the vehicle. In one embodiment, the third pliant attachment means 414 is connected to said inner surface of vane 401 at a distance of between 0.15 L and 0.5 L from the leading edge of said vane, preferably at a distance of between 0.15 L and 0.35 L from the leading edge of said vane, more preferably at about 0.26 L from the leading edge of said vane. In a further embodiment, the third pliant attachment means is connected to the inner surface of the vane at the aerodynamic center CG of the vane 401. A door may be present in the rear surface of the vehicle, and the at least one second pliant attachment means may connect the trailing edge of the vane to the door. In certain embodiments, third pliant attachment means 414 connects the vane 401 to the rear surface of the vehicle. If third pliant attachment means 414 and second pliant attachment means 420 each connect to the rear surface of the vehicle, they may connect to different points on the rear surface of the vehicle, as shown in FIG. 4; or to the same point on the rear surface of the vehicle. Typically, one vane is attached to each side of the vehicle in the manner described.

To avoid adding excess weight to the vehicle, the total weight of the vanes and the various ropes, cables, nylon straps, or other pliant attachment means may be less than 100 pounds, preferably less than fifty pounds, most preferably less than 20 pounds.

The first pliant attachment means 413 extends from the leading edge 402 of the vane 401 forwards and connects to side surface 412 of the vehicle, as shown in FIG. 4. The length of attachment means 413 controls the horizontal distance between the trailing edge of the rigid vane and the rear surface of the vehicle. Increasing the length of attachment means 413 moves the trailing edge of the vane backwards, increasing the distance between the trailing edge of the vane and the rear surface of the vehicle.

The second pliant attachment means 420 extends from the trailing edge 403 of the vane 401 and connects to the rear surface 411 of the vehicle, as shown in FIG. 4. The length of attachment means 420 controls the angle γ between the side surface of the vehicle and the chordline H of the vane 401. Decreasing the length of attachment means 420 increases angle γ. Changing angle γ alters the angle at which air flows over the vane, relative to the side of the truck.

The third pliant attachment means 414 connects the inner surface 405 of the vane to the vehicle, as shown in FIG. 4. The length of the third pliant attachment means 414 controls the distance I between the inner surface 405 of the vane and the side surface of said vehicle. Adjusting the length of the third pliant attachment means 414 changes the volume of air in a stream of slower, high pressure air traveling between the inner surface of vane 401 and the side of vehicle 100. Additionally, changing the length of attachment means 414 can alter the angle γ between the side surface of the vehicle and the chordline H of the vane 401 by moving the front of the vane closer to the vehicle.

Use of vanes according to various exemplary embodiments set forth in this disclosure can lead to significant savings in fuel consumption. In particular, depending on road conditions and prevailing winds, savings of approximately 5% to 20%, more particularly 5% to 15%, most particularly 7% to 15%, in fuel consumption can be achieved. Assuming a 10% reduction in fuel consumption, a reduction of up to 50 tons per truck per year in $CO_2$ emissions may be achieved.

Figure 5:
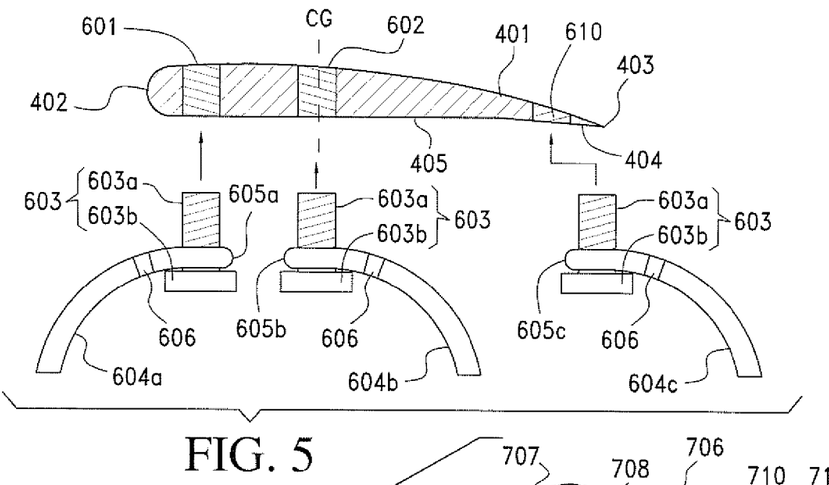
FIG. 5 shows a first method of connecting a series of pliant flexible attachments to a vane of the present disclosure.

FIG. 5 shows a method of connecting cables or other pliant materials to vane 401 by providing threaded female joints through vane 401. As shown in FIG. 5, a first set of threaded female joints 601 may be positioned in the leading edge of vane 401, and a second set of threaded female joints 610 may be positioned in the trailing edge of vane 401. A third set of threaded female joints 602 may be positioned in the vane 401 at a distance of between 0.15 L and 0.5 L from the leading edge of the vane, preferably between 0.15 L and 0.35 L from the leading edge of the vane, most preferably between 0.23 and 0.3 L from the leading edge of the vane.

In another embodiment, threaded female joints 602 are positioned at the aerodynamic center CG of the vane, as shown in FIG. 5. Bolts 603 having threaded male shafts 603a and heads 603b are provided. A rope or cable 604a having a loop 605a at one end is connected to a bolt 603 by passing shaft 603a through loop 605a secured by clamp 606. Rope or cable 604a is connected to joint 601 by screwing shaft 603a into joint 601 at leading edge 402. A rope or cable 604c having a loop 605c at one end is connected to a bolt 603 by passing shaft 603a through loop 605c. Rope or cable 604c is connected to joint 610 by screwing shaft 603a into joint 610 at trailing edge 403. A third rope or cable 604b having a loop 605b at one end is connected to a bolt 603 by passing shaft 603a through loop 605b. Rope or cable 604b is connected to joint 602 by screwing shaft 603a into joint 602. Loops 605a, 605c and 605b are held between the inner surface 405 of the vane, and bolt heads 603b.

Figure 6:
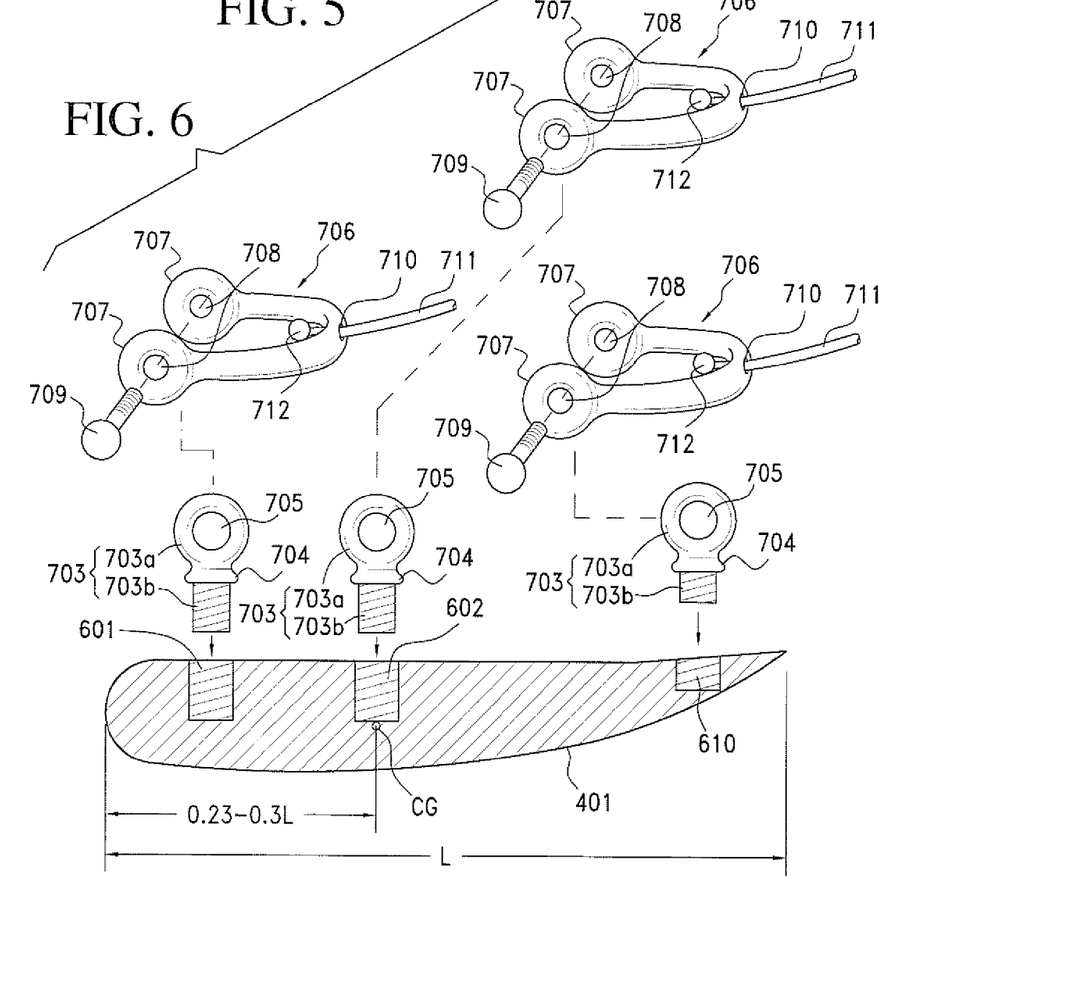
FIG. 6 shows an alternative method of connecting pliant flexible attachments to a vane of the present disclosure.

FIG. 6 shows use of another method of connecting cables or other pliant materials to vane 401 by providing threaded female joints through vane 401. As shown in FIG. 6, a first set of threaded female joints 601 may be positioned in the leading edge of vane 401, and a second set of threaded female joints 610 may be positioned in the trailing edge of vane 401. A third set of threaded female joints 602 may be positioned in the vane 401 at a distance of between 0.15 L and 0.5 L from the leading edge of the vane, preferably between 0.15 L and 0.35 L from the leading edge of the vane, most preferably between 0.23 and 0.3 L from the leading edge of the vane. In another embodiment, threaded female joints 602 are positioned at the aerodynamic center CG of the vane, as shown in FIG. 6. Eye bolts 703 having threaded male shafts 703b and ring-shaped heads 703a are provided. Each head 703a includes a shoulder 704 and a hole 705 therethrough. Each eye bolt 703 is screwed into one of joints 601, joints 602, or joints 610. A set of cable forks 706 are also provided. Each cable fork 706 is substantially U-shaped, and has two ends 707, where each end 707 has a hole 708 therethrough. Each cable fork 706 is positioned over an eye bolt 703 so that holes 708 in the cable fork coincide with hole 705 in the eye bolt so that holes 708 and 705 are aligned. A rivet 709 having a head and a shaft passes through this continuous passage, and is secured by mushrooming the end of the shaft. Preferably, cable fork 706 is able to pivot about an axis defined by the rivet. Cable fork 706 additionally includes a hole 710 at the center of the cable fork. Hole 710 has an axis which is perpendicular to the axis defined by the rivet. A cable 711 passes through hole 710 in cable fork 706. A bulb 712 holds cable 711 in position on the cable fork, connecting the cables to vane 401.

Figure 7:
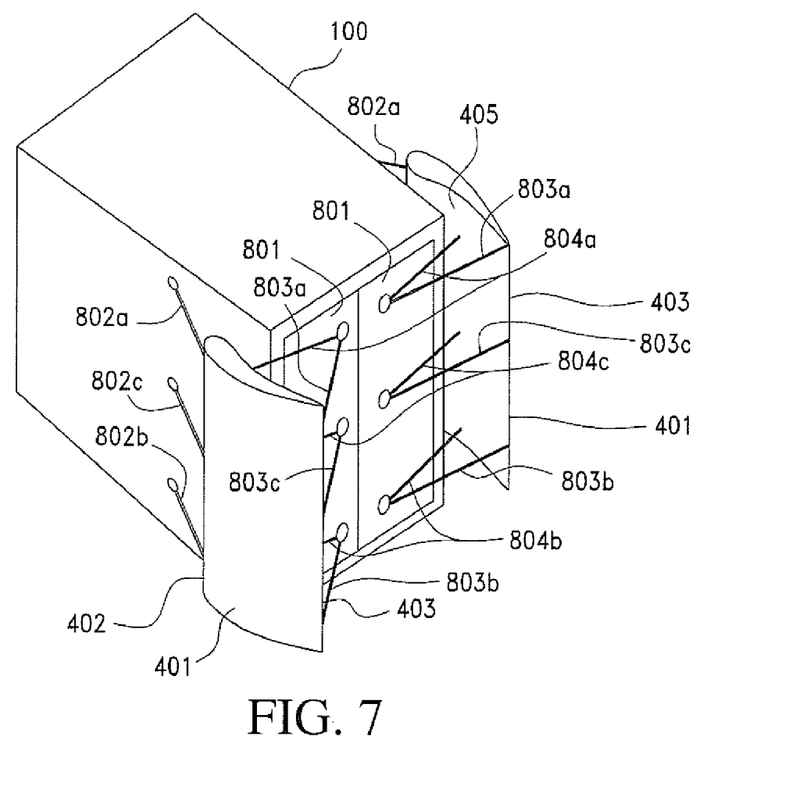
FIG. 7 shows the vanes of FIG. 4 connected to a vehicle having a generally planar rear surface with right and left rear doors.
Figure 8:
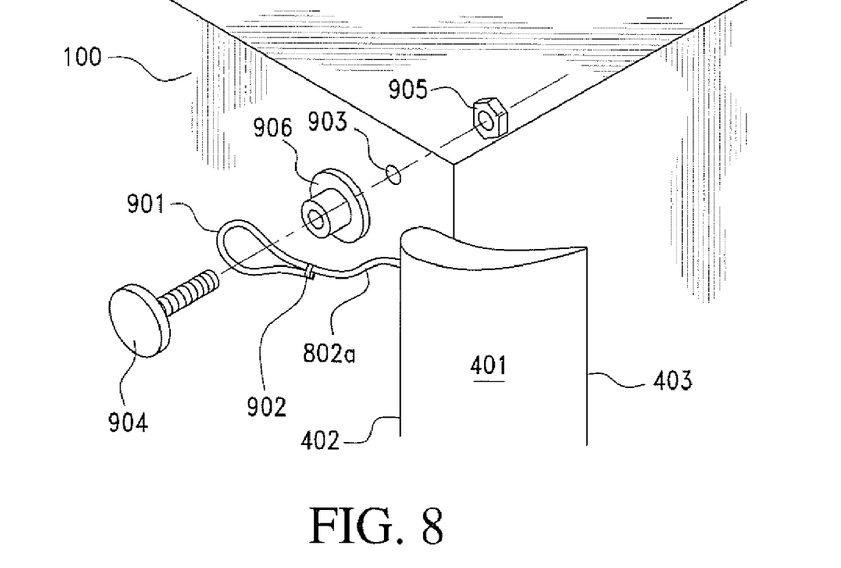
FIG. 8 provides an exploded view showing a method of connecting a vane to a vehicle by means of a pliant flexible attachment.

FIG. 7 and FIG. 8 illustrate one example of the manner in which the vanes are attached to a vehicle 100 having doors 801. This method may be performed on new vehicles or used to retrofit existing vehicles with vanes 401 with equal facility. As shown in FIG. 7, vehicle 100 has a left rear door and a right rear door. With the doors 801 in a closed position, the vanes are attached to the vehicle by connecting the leading edge 402 of a vane 401 to the left side of the vehicle 100. This may be done by fastening cable 802a or a similar pliant material from the upper end of leading edge 402 of vane 401 to the upper edge of the left side of vehicle 100. Similarly, cable 802b connects the lower end of the leading edge 402 of vane 401 to the lower edge of the left side of vehicle 100. Cable 802c connects a central portion of the leading edge 402 of vane 401 to a central portion of the edge of the left side of vehicle 100. Cable 803a or a similar pliant material from the upper end of trailing edge 403 of vane 401 to the rear surface of vehicle 100. Similarly, cable 803b connects the lower end of the trailing edge 403 of vane 401 to the rear surface of vehicle 100. Cable 803c connects a central portion of the trailing edge 403 of vane 401 to a central portion of the rear surface of vehicle 100. The inner surface 405 of vane 401 is then connected to the left side of the rear surface of vehicle 100 by connecting cables 804a, 804b, and 804c. In a preferred embodiment, cables 804a, 804b, and 804c are connected to a hinged door 801 in the rear surface of vehicle 100. A second vane 401 is attached to the vehicle by connecting the leading edge 402 of a vane 401 to the right side of the vehicle 100, connecting the trailing edge 403 of the second vane 401 to the rear surface of the vehicle 100, and connecting the inner surface 405 of the second vane 401 to the right side of the rear surface of vehicle 100.

The cables are connected to vehicle 100 as shown in FIG. 8, which illustrates connection of cable 802a extending from the upper end of the leading edge of vane 401; all cables are connected similarly (Please note that the top of vehicle 100 is not shown in FIG. 8, for reasons of clarity). For the purposes of this discussion, the cables are shown as being attached to vane 401. A loop 901 is formed at the end of each cable 802a and secured with a clamp 902 so that loop 901 may be positioned over grommet 906. A hole 903 is then drilled in the side of vehicle 100, and the cable loop 901 is secured to the vehicle by passing a bolt 904 through grommet 906 and hole 903, and securing the bolt in position using nut 905. The head of bolt 904 must be larger than loop 901. The grommet 906 must be positioned with the largest diameter surface flat against the side of vehicle 100. After assembly, a check may be performed to be sure the flexible cable rotates freely and the loop cannot slip over the bolt head. In a preferred embodiment, free rotation of the flexible cables around the grommets allows the vanes to be positioned properly when the doors are fully opened. This assembly installation procedure may be used on all fastened connections to the vehicle 100.

Since the cables are flexible, when vehicle 100 is stationary and doors 801 are closed, the vanes tend to hang loosely from the cables and rest against the rear corner edges of vehicle 100.

Figure 9A:
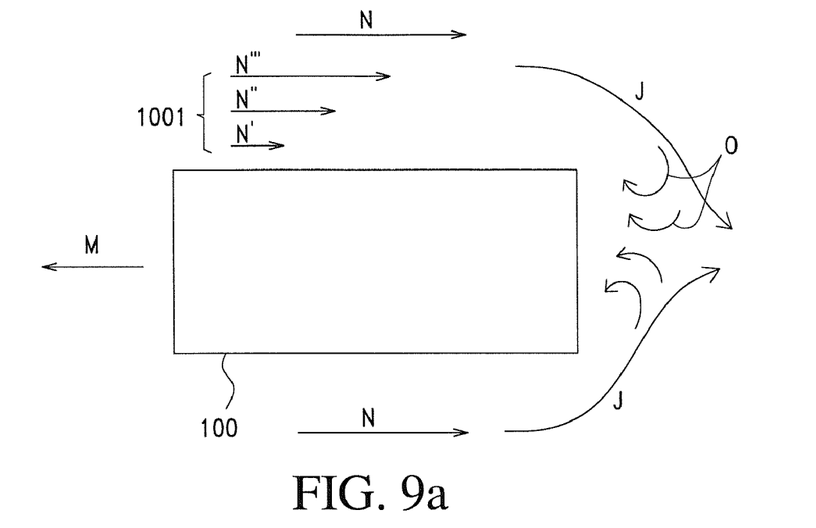
FIG. 9a shows the pattern of air flow around a vehicle lacking vanes as described in the present disclosure.

FIG. 9a shows vehicle 100 in motion in the direction of arrow M, in the absence of vanes 401. Under such conditions, air flows along the sides of vehicle 100 in the direction of arrow N at a defined velocity n. Near the surface of vehicle 100 is a boundary layer 1001, where air flows at a variable velocity. Near the surface of the vehicle, air flows along the sides of vehicle 100 in the direction of arrow N' at a defined velocity n' which is less than n. In the middle of the boundary layer, air flows along the sides of vehicle 100 in the direction of arrow N" at a defined velocity n" which is less than n, but greater than n'. At the outer edge of the boundary layer, air flows along the sides of vehicle 100 in the direction of arrow N''' at velocity n, equal to the velocity of the airflow outside the boundary layer. Additionally, the pressure at the front of vehicle 100 is greater than the pressure at the back of vehicle 100, creating pressure drag. At the rear of the truck, air flowing along the sides of the truck flows into the region of low pressure air behind the truck in the direction of arrows J. The twin airflows in the direction of arrows J meet behind the rear surface of the truck, relatively close to the rear surface of the truck. At least a portion of the air flowing in the direction of arrow J is sucked into the low pressure zone immediately behind the vehicle, creating a zone of turbulent air in the direction of arrows O behind the rear surface of the vehicle. Additionally, the velocity differential between the boundary layer and stream N can add to turbulence as the airflow reaches the rear surface of vehicle 100.

Figure 9B:
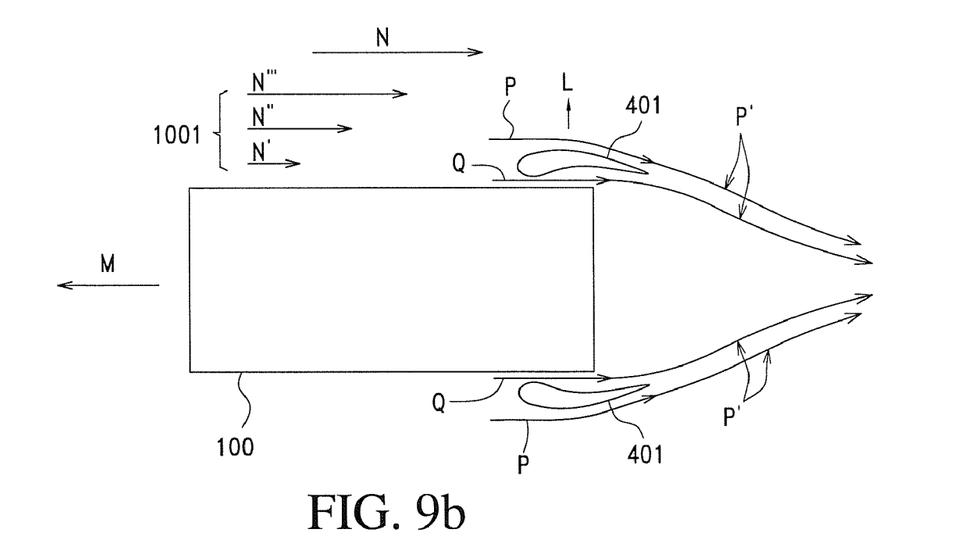
FIG. 9b shows the pattern of air flow around a vehicle of FIG. 7 having vanes according to the present disclosure.

FIG. 9b shows a vehicle 100 having vanes 401 mounted thereon in motion in the direction of arrow M. Under such conditions, air flows along the sides of vehicle 100 in the direction of arrow N at a defined velocity n. Near the surface of vehicle 100 is a boundary layer 1001, where air flows at a variable velocity. Near the surface of the vehicle, air flows along the sides of vehicle 100 in the direction of arrow N' at a defined velocity n' which is less than n. In the middle of the boundary layer, air flows along the sides of vehicle 100 in the direction of arrow N" at a defined velocity n" which is less than n, but greater than n'. At the outer edge of the boundary layer, air flows along the sides of vehicle 100 in the direction of arrow N''' at velocity n''', equal to the velocity of the airflow outside the boundary layer. As the airflow reaches vane 401, it divides into a stream P of fast, low pressure air traveling over the outer surface of vane 401, and a stream of slower, high pressure air Q traveling between the inner surface of vane 401 and the side of vehicle 100. The pressure difference between stream P and stream Q creates a force causing the vane to move away from vehicle 100 in the direction of arrow L. Streams P and Q, unlike stream J in FIG. 9a, do not flow directly into the region of low pressure air immediately behind the truck. Rather, they flow along the surfaces of vane 401 and meet behind the trailing edge of vane 401. The resulting combined airstreams continue to flow in the direction of arrows P' until they meet at a point which is significantly removed from the region of low pressure air immediately behind the rear surface of the truck. Streams P' thus flow together with little or no tendency for air from these airstreams to be sucked into the region of low pressure air behind the rear surface of the truck. As a result, little or no turbulence is formed behind the rear surface of the truck, dramatically reducing pressure drag on the vehicle. Additionally, the stream P of fast, low pressure air traveling over the outer surface of vane 401 is unable to enter a region of low pressure air behind the rear surface of the truck, since the vane itself blocks the stream P from changing direction. Stream P thus tends to continue to flow in the direction of arrow P', with a reduced tendency to form a region of low pressure, turbulent air at the rear surface of the vehicle. The point at which streams P' meet may be controlled by adjusting the distance between the side of the truck and vanes 401, and the angle γ between the side of the truck and vanes 401.

As noted above with regard to FIG. 4, the length of attachment means 413 controls the horizontal distance between the trailing edge of the rigid vane and the rear surface of the vehicle. Increasing the length of attachment means 413 moves the trailing edge of the vane backwards, increasing the distance between the trailing edge of the vane and the rear surface of the vehicle. The stream P of fast, low pressure air (seen in FIG. 9*b*) traveling over the outer surface of vane 401 is unable to enter a region of low pressure air behind the rear surface of the truck until it reaches the trailing edge of the vane 401. This reduces formation of a zone of turbulent air immediately behind the vehicle. Increasing the distance between the trailing edge 403 of the vane and the rear surface of the vehicle forces stream P to travel a greater distance before entering the region of low pressure air behind the vehicle, thereby further reducing formation of the zone of turbulent air behind the vehicle.

Figure 10A:
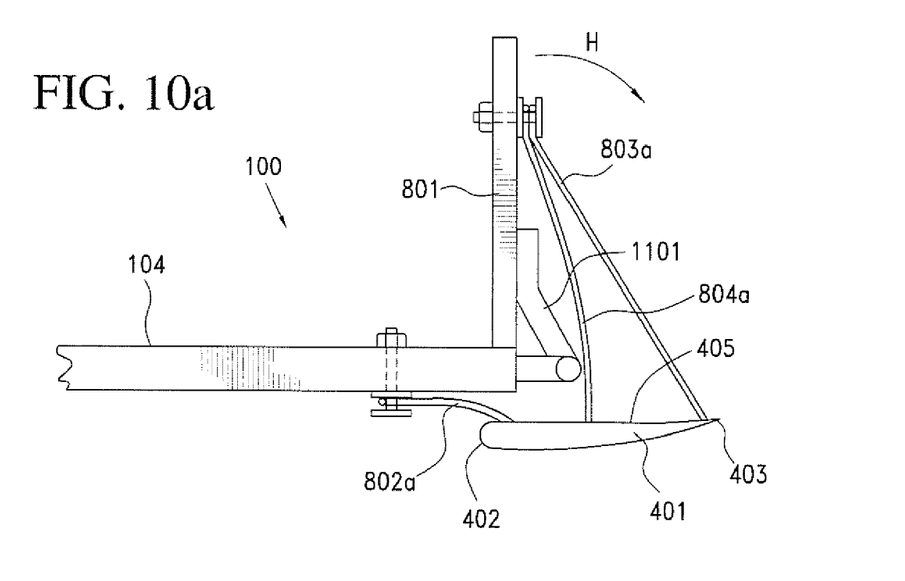
FIGS. 10a, 10b, and 10c show the effect of opening the rear door of a vehicle having vanes as described in the present disclosure attached thereto on the positioning of the vanes.
Figure 10B:
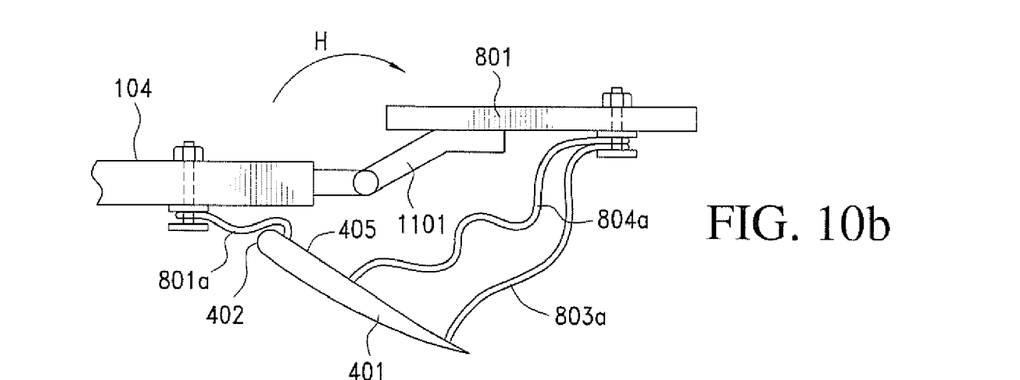
Figure 10C:
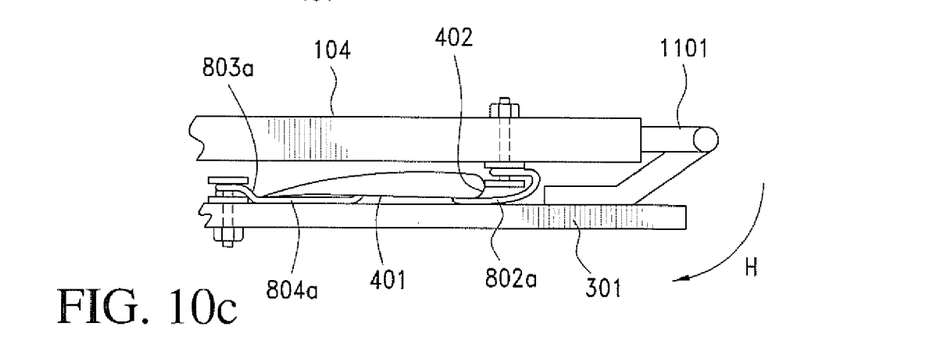

As shown in FIG. 10*a*, FIG. 10*b*, and FIG. 10*c*, the vanes 401 of this invention, when mounted using a set of flexible cables, have the further benefit that the vanes 401 do not impede opening of the right and left rear doors 801, unlike prior art vanes mounted using rigid brackets. The flexible nature of the cables or other pliant attachment means connecting the vanes to the vehicles allows the vane to fold back out of the way as door 801 opens. In FIG. 10*a*, the upper end of vane 401 is secured to door 801 using cables 803*a* and 804*a*, and to side 104 of vehicle 100 using cable 802*a* (Cables connecting the central portion and lower end of the vane to the vehicle, although needed to properly secure the vane to the vehicle, are omitted for clarity). Cable 802*a* connects the leading edge of vane 401 to side 104 of vehicle 100. Cable 803*a* connects the trailing edge of vane 401 to door 801 of vehicle 100. Cable 804*a* connects the inner surface 405 of vane 401 to door 801 in the rear surface of vehicle 100. The inner surface 405 of vane 401 lies over hinge 1101, with the leading edge 402 of the vane extending over side 104 of the vehicle, and the trailing edge 403 of the vane extending behind vehicle 100.

As door 801 opens, it swings about hinge 1101 in the direction of arrow H, vane 401 swings away from the vehicle (FIG. 10*b*). As door 801 continues to swing in the direction of arrow H (FIG. 10*c*), the outer surface of vane 401 folds back against wall 104 of the vehicle, allowing the door 801 to be fully opened. In this position, the inner surface 405 of vane 401 lies against door 801. The ability of the vanes to fold against wall 104 greatly facilitates loading and unloading of the vehicle. It also reduces operator costs for labor, as there is no need to pay workers for time spent mounting and dismounting vanes during the loading/unloading process.

Figure 11:
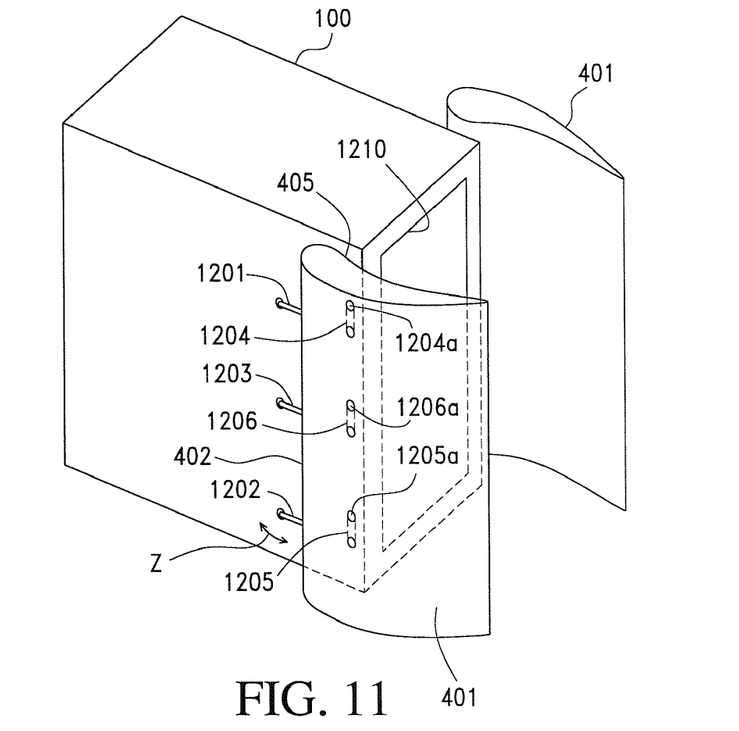
FIG. 11 shows a method of connecting a vane to a vehicle having a single rear door by means of flexible pliant flexible attachments.

In another embodiment, the vanes of the present invention may be connected to a vehicle 100 having a rear surface with a door 1210 that is not hinged to swing outwardly, as in FIG. 11. For example, the vehicle may have a door 1210 that rolls up vertically. In any of these cases, connection of the vane 401 to door 1210 as shown in FIG. 8 can be still be done, but it is less preferred. This is because the necessary cable connections would preclude opening of the door without removing the vane. Accordingly, an alternate connection method is here described that allows vanes 401 to be mounted to a door 1210 that is not hinged to swing outwardly, shown in FIG. 11. As shown in FIG. 11, vehicle 100 has a single roll-up door 1210. With the door 1210 in a closed position, the vanes are attached to the vehicle by connecting the leading edge 402 of a vane 401 to the left side of the vehicle 100. This may be done by fastening cable 1201 from the upper end of leading edge 402 of vane 401 to the upper edge of the left side of vehicle 100. Similarly, cable 1202 connects the lower end of the leading edge 402 of vane 401 to the lower edge of the left side of vehicle 100. At least one cable 1203 connects a central portion of the leading edge 402 of vane 401 to a central portion of the edge of the left side of vehicle 100. If desired, multiple cables 1203 may be used. Preferably, cables 1201, 1202, and all cables 1203 are evenly spaced along the length of the vane, and all extend forward toward a front of vehicle 100. The inner surface 405 of vane 401 is then connected to the left side of the rear surface of vehicle 100 by fastening cable 1204 from the upper end of the inner surface 405 of vane 401 to the left side of vehicle 100. Cable 1204 preferably runs vertically in an upwards direction to a point of attachment 1204*a* on the rear edge of the left side of vehicle 100. Similarly, cable 1205 vertically connects the lower end of the inner surface 405 of vane 401 to a point of attachment 1205*a* on the rear edge of the left side of vehicle 100. At least one cable 1206 vertically connects a central portion of the inner surface 405 of vane 401 to a point of attachment 1206*a* on the rear edge of the left side of vehicle 100. Preferably, cables 1204, 1205, and all cables 1206 are each connected to the inner surface of vane 401 at the aerodynamic center of vane 401; or at a distance of 0.15 L to 0.5 L, preferably 0.15 L to 0.35 L, more preferably 0.26 L, where L is the length of the vane, from the leading edge of the vane. A second vane 401 is attached to the vehicle by connecting the leading edge 402 of a vane 401 to the right side of the vehicle 100, and connecting an inner surface 405 of the vane 401 to the right side of the vehicle 100 in the exact same way. Since neither vane is connected to door 1210, door 1210 can be opened without requiring removal of either or both vanes 401. The vane hangs from cables 1204, 1205, and 1206, allowing the cable to move reversibly in the direction of arrow Z.

In the embodiment of FIG. 11, vanes 401 hang downwardly from vertical cables 1204, 1205, and 1206. When the truck is at rest, vanes 401 are able to move reversibly in the direction of arrows Z on flexible cables 1204, 1205, and 1206. This allows vanes 401 to move out of the way in the direction of arrow Z without any involvement from the driver when the truck is backed up against a loading dock. Contact with a wall or ledge surrounding the loading dock pushes the vanes backwards in the direction of arrow Z, allowing the truck to back up against the loading dock without requiring the driver to manually adjust or dismantle the vanes.

Figure 12:
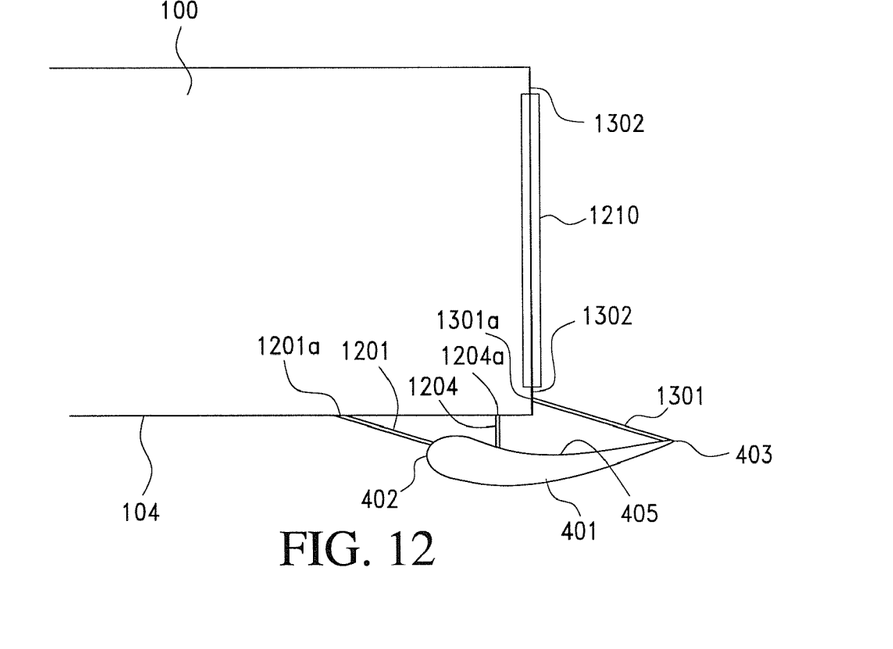
FIG. 12 shows a top view of a vane connected to a vehicle having a single rear door by means of flexible pliant flexible attachments.

FIG. 12 shows a top view of a vehicle 100 having a door 1210 on its rear surface with a vane 401 attached thereto. As previously described, cable 1201 extends in a forward direction and connects the leading edge 402 of vane 401 to a side 104 of the vehicle at point of attachment 1201*a*. Cable 1204 extends vertically and connects the inner surface 405 of vane 401 to the rear edge of the side of the vehicle point of attachment 1204*a*. Since neither of cables 1201 or 1204 is connected to the rear of the vehicle, the horizontal distance between points of attachment 1201*a* and 1204*a* is relatively small, leading to reduced stability of the vane in an airstream. One or more cables 1301 is used to connect trailing edge 403 of vane 401 to a point of attachment 1301*a* on door jamb 1302, where door jamb 1302 surrounds door 1210 on the rear surface of vehicle 100.

While the foregoing discussion is primarily directed to unpowered vehicles being towed behind a separate, powered vehicle, the invention is not limited to such a configuration. It may equally well be applied to any powered vehicle having a substantially planar rear surface.

Although the present invention has been described in detail with particular reference to preferred embodiments thereof, it should be understood that the invention is capable of other different embodiments, and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only, and do not in any way limit the invention, which is defined only by the claims. In particular, the precise structure and design of the vanes as disclosed herein are capable of modifications which would be within the skill of a person of ordinary skill in the art having an advanced degree in aeronautical engineering.

What is claimed is:

1. An apparatus for reducing drag on a moving vehicle having a substantially planar rear surface, comprising:
    a) a rigid vane having a leading edge, a trailing edge, and an inner surface;
    b) at least one first pliant attachment means connecting said leading edge of said vane to a side surface of said vehicle;
    c) at least one second pliant attachment means connecting said trailing edge of said vane to a rear surface of said vehicle; and
    d) at least one third pliant attachment means connecting said inner surface of said vane to said vehicle;
        wherein said vane helps reduce or prevent formation of a volume of turbulent air behind said rear surface.

2. The apparatus of claim 1, wherein said third pliant attachment means is connected to said inner surface of said vane at an aerodynamic center of said vane.

3. The apparatus of claim 1, wherein said at least one third pliant attachment means connects said inner surface of said vane to said rear surface of said vehicle.

4. The apparatus of claim 1, wherein said at least one third pliant attachment means connects said inner surface of said vane to said side surface of said vehicle, wherein said vane hangs from said at least one third pliant attachment means.

5. The apparatus of claim 1, wherein the inner surface of said vane has a leading portion and a trailing portion;
    wherein said leading portion of the inner surface of said vane and said trailing portion of the inner surface of said vane meet at an angle.

6. The apparatus of claim 5, wherein said trailing portion of the inner surface of said vane meets said leading portion of the inner surface of the vane with a defined angle of deflection $\alpha$, said defined angle of deflection $\alpha$ being between 0° and 10°.

7. The apparatus of claim 6, wherein said defined angle of deflection $\alpha$ is between 0° and 7°.

8. The apparatus of claim 1, wherein the outer surface of said vane is curved.

9. The apparatus of claim 1, wherein said at least one first pliant attachment means makes a plurality of connections between said leading edge of said vane and said side surface of said vehicle.

10. The apparatus of claim 9, wherein said at least one first pliant attachment means connects at least an upper end of said leading edge of said vane and a lower end of said leading edge of said vane to said side surface of said vehicle.

11. The apparatus of claim 10, wherein said at least one first pliant attachment means comprises at least a first cable connecting an upper end of said leading edge of said vane to said side surface of said vehicle and a second cable connecting a lower end of said leading edge of said vane to said side surface of said vehicle.

12. The apparatus of claim 11, wherein said at least one first pliant attachment means additionally comprises at least one third cable connecting a central portion of said leading edge of said vane to said side surface of said vehicle.

13. The apparatus of claim 1, wherein there is a door in said rear surface of said vehicle, and said at least one second pliant attachment means connects said trailing edge to said door.

14. The apparatus of claim 1, wherein said at least one third pliant attachment means connects at least an upper end of said vane and a lower end of said vane to said vehicle.

15. The apparatus of claim 14, wherein said at least one third pliant attachment means comprises at least a first cable connecting an upper end of said vane to said vehicle and a second cable connecting a lower end of said leading edge of said vane to said vehicle.

16. The apparatus of claim 1, wherein the vehicle is an unpowered vehicle adapted to be towed by a second powered vehicle.

17. The apparatus of claim 16, wherein the vehicle is a trailer.

18. The apparatus of claim 1, wherein the vehicle is a powered vehicle.

19. The apparatus of claim 18, wherein the vehicle is a bus, panel truck, or delivery van.

20. The apparatus of claim 1, wherein the vehicle comprises an enclosed structure for carrying cargo or passengers.

21. An apparatus for transporting cargo with decreased drag, comprising:
    a vehicle adapted to carry cargo, said vehicle having a generally planar rear surface;
    at least one rigid vane having a leading edge, a trailing edge, and an inner surface, said at least one rigid vanes being mounted to a side of the vehicle;
    wherein said at least one rigid vane is connected to said vehicle by:
    a first pliant attachment means which controls the horizontal distance between the leading edge of the at least one rigid vane and the rear surface of the vehicle;
    a second pliant attachment means which controls an angle between said side surface of said vehicle and a chordline of the at least one rigid vane; and
    a third pliant attachment means which controls the distance between the inner surface of the at least one rigid vane and a side surface of said vehicle;
    wherein said at least one rigid vane reduces drag on said vehicle by reducing formation of a volume of turbulent air behind said rear surface.

22. The apparatus of claim 21, wherein:
    said first pliant attachment means connects the leading edge of the at least one rigid vane to the side surface of the vehicle;
    said second pliant attachment means connects the trailing edge of the at least one rigid vane to the rear surface of the vehicle; and
    said third pliant attachment means connects an aerodynamic center of the at least one rigid vane to the vehicle.

23. The apparatus of claim 21, wherein:
    the at least one rigid vane comprises two rigid vanes, said two rigid vanes being mounted on opposite sides of said vehicle.

24. A method of modifying a vehicle having a substantially planar generally planar rear surface so as to reduce drag on the vehicle, said method comprising the steps of:

preparing a first rigid vane having a leading edge, a trailing edge, and an inner surface;

connecting said leading edge of said first vane to a first side of said vehicle by means of at least one first pliant attachment means;

connecting said trailing edge of said first vane to said rear surface of said vehicle by means of at least one second pliant attachment means;

connecting said inner surface of said first vane to said vehicle by means of at least one third pliant attachment means;

wherein said first vane reduces formation of a volume of turbulent air behind said rear surface.

25. The method of claim 24, wherein the first rigid vane has an aerodynamic center between said leading edge and said trailing edge; and connecting said inner surface of said first vane to said vehicle comprises connecting said aerodynamic center of said first vane to said vehicle by means of said at least one third pliant attachment means.

26. The method of claim 24, additionally comprising the steps of:

preparing a second rigid vane having a leading edge, a trailing edge, and an inner surface; and connecting leading edge, said trailing edge, and said inner surface of said second vane to a second side of said vehicle by additional pliant attachment means;

wherein said second vane reduces formation of a volume of turbulent air behind said rear surface.

27. An apparatus for reducing drag on a moving vehicle having a substantially planar rear surface, comprising:

a) a rigid vane having a leading edge, a trailing edge, and an aerodynamic center between said leading edge and said trailing edge;

said vane having an inner surface facing said vehicle and an outer surface;

b) at least one forwardly extending first pliant attachment means connecting said leading edge of said vane to a first point of attachment on a side surface of said vehicle; and c) at least one second pliant attachment means connecting said trailing edge of said vane to a second point of attachment on a rear surface of said vehicle; and d) at least one third pliant attachment means connecting said inner surface of said vane to a third point of attachment on a rear edge of said side surface of said vehicle, said third point of attachment being behind said first point of attachment;

wherein said vane hangs from said third pliant attachment means.

* * * * *